United States Patent
DeFilippis (12) 
(10) Patent No.: US 9,071,180 B2
(45) Date of Patent: Jun. 30, 2015

(54) ELECTRIC DRIVE UNIT

(75) Inventor: Pietro DeFilippis, Varazze (IT)

(73) Assignee: SPAL AUTOMOTIVE, S.R.L. (IT)

( * ) Notice: Subject to any disclaimer, the term of this patent is extended or adjusted under 35 U.S.C. 154(b) by 20 days.

(21) Appl. No.: 14/119,729

(22) PCT Filed: Jun. 13, 2012

(86) PCT No.: PCT/IB2012/052973
§ 371 (c)(1),
(2), (4) Date: Jan. 17, 2014

(87) PCT Pub. No.: WO2012/172488
PCT Pub. Date: Dec. 20, 2012

(65) Prior Publication Data
US 2014/0152215 A1    Jun. 5, 2014

(30) Foreign Application Priority Data
Jun. 13, 2011   (IT) .............................. BO2011A0340

(51) Int. Cl.
*H02P 6/14*    (2006.01)
*H02P 6/18*    (2006.01)
(Continued)

(52) U.S. Cl.
CPC ................ *H02P 6/147* (2013.01); *H02P 6/002* (2013.01); *H02P 23/0036* (2013.01)

(58) Field of Classification Search
CPC . H02P 23/14; H02P 29/0066; H02P 29/0055; H02P 6/182; H02P 21/06; H02P 21/145; H02P 29/0088; H02P 6/08; H02P 6/10; H02P 6/20; H02P 21/0003; H02P 21/14; H02P 29/02; H02P 29/028; H02P 6/06
USPC ........ 318/400.14, 400.35, 432, 254, 439, 567
See application file for complete search history.

(56) References Cited

U.S. PATENT DOCUMENTS 6,002,234 A * 12/1999 Ohm et al. .................... 318/729
6,373,211 B1 * 4/2002 Henry et al. .................. 318/432
(Continued)

FOREIGN PATENT DOCUMENTS

EP          2 195 916        6/2010
WO       2009/034455        3/2009

OTHER PUBLICATIONS

International Search Report and Written Opinion dated Oct. 9, 2012 from counterpart PCT App No. PCT/IB2012/052973.
(Continued)

*Primary Examiner* — Paul Ip
(74) *Attorney, Agent, or Firm* — Timothy J. Kilma; Shuttleworth & Ingersoll, PLC (57) ABSTRACT

An electric drive unit includes an electric motor, an inverter supplying electricity to the motor, a continuous current stage supplying electricity to the inverter, a controller including a modulator for driving the inverter controlled by a first digital signal representing the amplitude of the phase voltages to be applied to the motor and by a second digital signal representing the electrical frequency of the phase voltages. An analog/digital stage calculates the optimum value of the advance angle ($\delta$opt) of the voltage applied to the motor relative to the counter-electromotive force ("CEMF") as a linear function of the peak value of the phase current and an analog/digital stage for measuring the angle ($\phi$act) between the voltage applied to the electric motor and the phase current. The controller is programmed for estimating the angle ($\gamma$act) between the phase current and the CEMF as the difference between $\delta$opt and $\phi$act.

7 Claims, 5 Drawing Sheets

(51) Int. Cl.
*H02P 6/00* (2006.01)
*H02P 23/00* (2006.01)

(56) References Cited

U.S. PATENT DOCUMENTS

| | | | |
|---|---|---|---|
| 2003/0046028 A1* | 3/2003 | Mir et al. | 702/183 |
| 2003/0062868 A1* | 4/2003 | Mir et al. | 318/599 |
| 2003/0071594 A1* | 4/2003 | Kleinau et al. | 318/567 |
| 2003/0076061 A1* | 4/2003 | Kleinau et al. | 318/432 |
| 2003/0076064 A1* | 4/2003 | Kleinau et al. | 318/567 |
| 2003/0076065 A1* | 4/2003 | Shafer et al. | 318/567 |
| 2004/0095089 A1* | 5/2004 | Collier-Hallman | 318/567 |
| 2005/0029976 A1* | 2/2005 | Terry et al. | 318/439 |
| 2005/0269982 A1* | 12/2005 | Coles et al. | 318/254 |
| 2007/0132446 A1* | 6/2007 | Kleinau et al. | 324/160 |
| 2008/0118234 A1* | 5/2008 | Schneider et al. | 388/811 |
| 2008/0203962 A1* | 8/2008 | Maeda et al. | 318/721 |
| 2009/0189561 A1* | 7/2009 | Patel et al. | 318/806 |
| 2009/0261775 A1* | 10/2009 | Son et al. | 318/778 |
| 2010/0201298 A1* | 8/2010 | De Filippis | 318/400.35 |
| 2011/0018485 A1 | 1/2011 | Maeda et al. | |

OTHER PUBLICATIONS

"A Sensorless, Stable V/f Control Method for Permanent-Magnet Synchronous Motor Drives"—IEEE Transactions on Industry Applications, vol. 39, No. 3, May/Jun. 2003.

* cited by examiner

ELECTRIC DRIVE UNIT

This application is the National Phase of International Application PCT/IB2012/052973 filed Jun. 13, 2012 which designated the U.S. and that International Application was published under PCT Article 21(2) in English.

This application claims priority to Italian Patent Application No. BO2011A000340 filed Jun. 13, 2011, which application is incorporated by reference herein.

TECHNICAL FIELD

This invention relates to an electric drive unit and in particular a sinusoidal (in jargon AC) electric drive unit.

BACKGROUND ART

By way of a non-limiting example reference is made below to an electric drive unit comprising a brushless three-phase motor with permanent magnets generating a counter-electromotive force (CEMF) with a sinusoidal form for driving solenoid valves and pumps.

Solenoid valve and electric pump applications require minimum acoustic noise and the reduction of both energy consumption and costs.

These needs have led to the adoption of CEMF sinusoidal brushless motors (AC brushless motors) driven by inverters which are able to impart sinusoidal winding currents, rendering obsolete the use of brushless DC motors driven in PWM six-step.

The sinusoidal trend of the CEMF and, together, of the relative phase current, ensure minimum active torque ripple (virtually zero) and consequently low mechanical vibrations and, therefore, acoustic emissions.

It is also possible to minimise current absorption for the generation of a certain drive torque, and therefore maximise the efficiency of the electromechanical conversion, by an optimum driving of the AC brushless motors which are normally driven by current-controlled, impressed voltage inverters.

This drive requires that the switching of the static switches is performed in such a way as to ensure, instant by instant, that the polar axis of the rotor magnetic field remains at 90 electrical degrees relative to the polar axis of the magnetic field generated by the currents circulating in the stator windings, whatever the torque and the rotation speed.

To obtain continuous information regarding the angular position of the rotor, costly sensors are usually used such as, for example, absolute encoders, resolvers or Hall-effect sensors.

The output signals generated by the sensors are then conveniently processed to control the static switches of the inverter so as to maintain the angular shift of 90 electrical degrees between rotor and stator magnetic fields.

The presence of the position sensors renders the operation relatively costly and, therefore, various drive strategies have been developed which do not use them, in jargon "sensorless", precisely to reduce the costs of the operations.

Amongst these strategies those based on the orientation of the stator and rotor fields (in jargon FOC) guarantee the aforementioned orthogonal relationship of the fields making use of sophisticated and costly integrated circuits (IC) with high calculation capacities (in jargon DSP) performing the real-time calculation of the rotor angular position, based exclusively on electrical quantities (voltages at the motor terminals and currents circulating in the windings) provided by suitable conditioning circuits.

When the "dynamics" of the machine driven are not too intense—and this is the case with electric fans and electric pumps—it is possible to apply an optimum criteria, derived directly from the fundamental mentioned above and described below (the polar axis of the rotor magnetic field is maintained, instant by instant, at 90 electrical degrees to the polar axis of the magnetic field generated by the currents circulating in the stator windings): the drive works in such a way that the CEMF and the phase current are kept in phase; naturally, the aforesaid criterion is complied with at every point of the operational field (torque, rotation speed, D.C. supply voltage).

The "sensorless" drives which implement drive strategies teased on the aforesaid criterion are founded on the reading of electrical quantities (such as voltages at the motor terminals, currents circulating in the motor windings) with the purpose of:

detecting the zero crossing of the CEMF and the current;
assessing the relative phase between CEMF and current;
implementing, lastly, suitable methods of driving the static switches of the inverter which keep in phase the two quantities just mentioned.

A first drawback of these strategies lies in the fact that for detecting the zero crossing of the CEMF, that is, to read the sign of the CEMF, as soon as the current crossing the windings becomes zero it must be kept as such for a sufficiently long period of time to allow the reading of the CEMF, which is in contrast with the desired sinusoidal trend of the current for obtaining a low acoustic noise.

A solution to this problem has been proposed in patent EP2195916 in the name of the same Applicant. However, the solution identified introduces an incremental cost due to the use of an "analogue" hardware network of the impedance of a phase of the motor.

A second drawback of the aforesaid control strategies is linked to the need to read the phase current. There are basically two approaches for this reading, both costly, according to the state of the art.

A first approach uses at least one IC device which integrates a Hall-effect sensor sensitive to the magnetic field generated by the phase current (solution with galvanic insulation) whilst a second approach uses at least one IC device which integrates an amplifier to process the voltage across an "outside earth" shunt through which the phase current flows (solution without galvanic insulation).

In the first case the IC device must be positioned close to one of the conductors crossed by the phase current and must have a very low sensitivity to the "parasitic" magnetic fields.

In the second case the common-mode input voltage which the amplifier must accept without damaging itself must be at least equal to the supply voltage of the inverter (Vbus).

DISCLOSURE OF THE INVENTION

In this context, the main technical purpose of this invention is to provide an electric drive unit which is free of the above-mentioned drawbacks both in terms of performance and cost.

One aim of this invention is to provide a noiseless electric drive unit with low energy consumption.

A further aim of this invention is to provide an electric drive unit based on a simple control architecture and competitive in cost.

The technical purpose indicated and the aims specified are substantially achieved by an electric drive unit comprising the technical features described in independent claim 1.

BRIEF DESCRIPTION OF THE DRAWINGS

Further features and advantages of the invention are more apparent in the non-limiting description which follows of a preferred non-limiting embodiment of an electric drive unit illustrated in the accompanying drawings, in which.

DESCRIPTION OF THE PREFERRED EMBODIMENTS OF THE INVENTION

Figure 1:
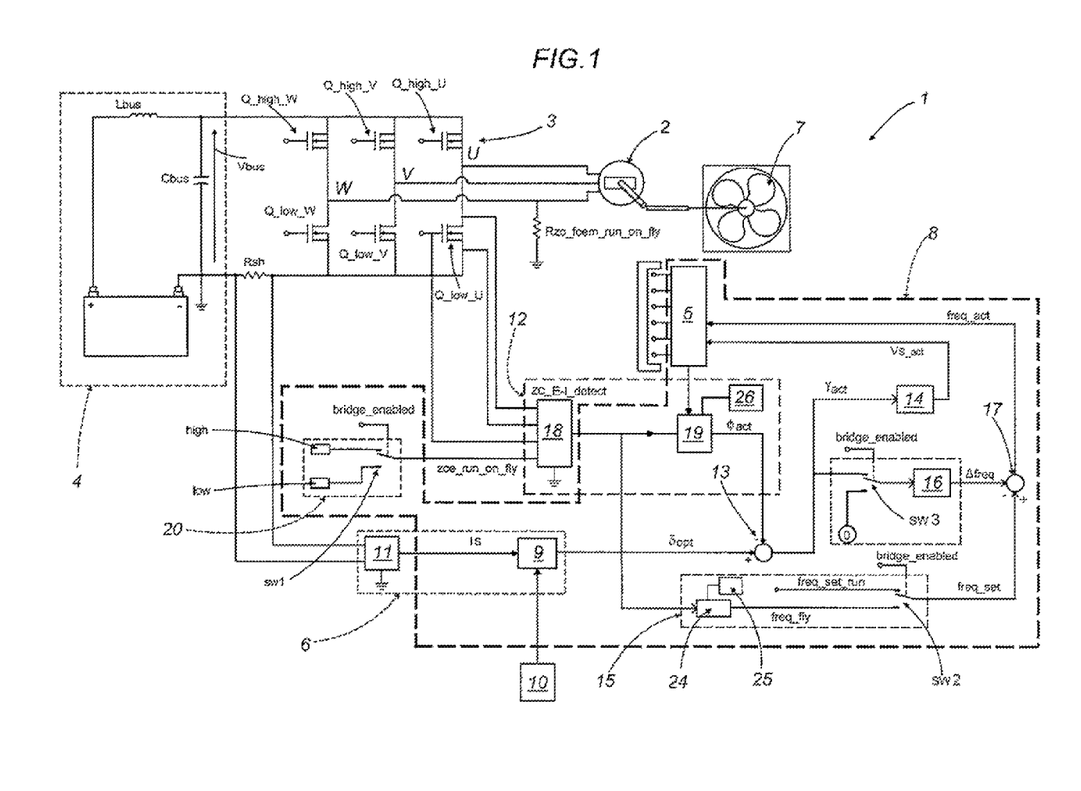
FIG. 1 is a block diagram of the electric drive unit according to this invention.

With reference to the accompanying drawings, with particular reference to FIG. 1, the numeral 1 denotes an electric drive unit according to this invention.

It should be noted that the block diagram of FIG. 1 does not show parts which may be operationally considered as prior art, that is, the MOSFET drivers and the user control interface for the analogue or digital external inputs, that is, for the controls which set the speed or the frequency for the electric drive unit 1.

The electric drive unit 1 comprises an electric motor 2 with permanent magnets, a three-phase bridge or inverter 3 for electricity supply at Vbus voltage to the electric motor 2, a continuous current stage 4 for electricity supply to the inverter 3 and a controller 8 for driving the inverter 3.

The controller 8 is an extremely simple and inexpensive acquisition/processing device and it is provided with data storage memory.

The drive unit 1 also comprises, as described in more detail below, a low-cost analogue unit 11 for measuring the peak value of the phase current Is, known as "pk_detect", and an analogue unit 18, known as "zc_E-I_detect", for detecting the zero crossing of a first phase current, for example of the phase indicated with U, of the electric motor 2 both in communication with the controller 8.

In the embodiment illustrated, the inverter 3 has three branches U, V, W, each comprising a pair of MOSFET, respectively Q_high_U, Q_low_U, Q_high_V, Q_low_V and Q_high_W, Q_low_W connected according to the prior art.

As illustrated, the stage 4 is provided with a filter stage, for example comprising a levelling condenser (Cbus) and an inductance (Lbus).

For example, without in any way restricting the scope of the invention, reference is made below to a permanent magnet brushless motor with bipolar isotropic rotor.

The three-phase stator winding comprises three windings, of identical type and number of turns, with 120° phase displacement and with star connection with star point not accessible or delta connection.

Figure 2:
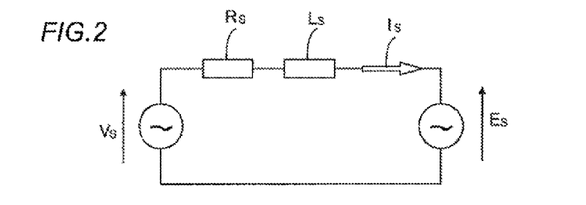
FIG. 2 shows the equivalent circuit of a phase of the AC brushless motor.
Figure 3A:
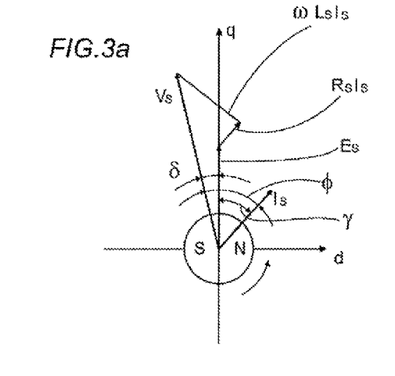
FIG. 3a shows the vector diagram relative to the circuit of FIG. 2.
Figure 3B:
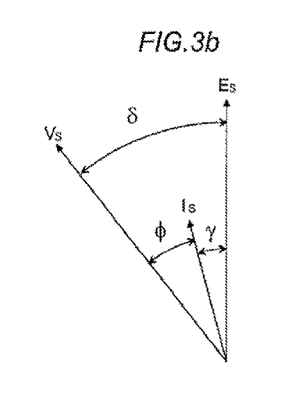
FIG. 3b shows a second vector diagram relative to the circuit of FIG. 2.

FIG. 2 illustrates, for example, the circuit model of a phase of the motor and FIG. 3 illustrates the vector diagram of the electrical quantities.

Each of the three windings is characterised by its resistance Rs, its synchronous inductance Ls and the CEMF, which has a sinusoidal curve and it is due to the rotation of the permanent magnet rotor; Is represents the phase current, which is also sinusoidal, passing through each of the three windings.

The vector Vs represents the applied voltage whilst the vector Es represents the CEMF induced in each of the three stator windings.

Conveniently, the modules of the vectors Es, Vs, Is are identified as the peak values of the quantities to which they refer.

the CEMF Es is a function of the temperature of the magnets Tmag as it is proportional to the residual induction Br of the permanent magnets used and in turn the latter depends on the temperature of the magnets; with αmag the coefficient of variation of the residual induction with the temperature the following relationship applies:

$$E_S(T_{mag}) = E_{S0} \cdot [1 + \alpha_{mag} \cdot (T_{mag} - T_{0mag})]$$

where $E_{S0}$ is the CEMF at the reference temperature of the magnets $T_{0mag}$.

The direct axis d is oriented according to the flow direction of the rotor Φr and the quadrature axis q forms an angle of 90° with the direct axis d.

Based on the induction law (e=dφ/dt) the induced CEMF Es in the stator winding is always directed according to the quadrature axis q, that is, it is 90° out of phase in advance relative to the rotor flow Φr.

The voltage Vs applied by the drive unit to the stator windings is, as mentioned above, represented by the vector Vs.

The electromagnetic power of the motor is given by 3EsIs cos(γ) where γ is the angle between Es and Is (γ positive if Is in advance of Es).

Figure 4:
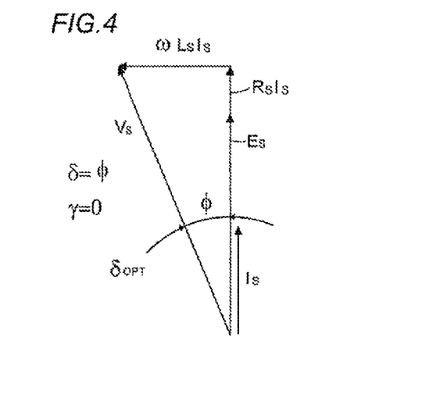
FIG. 4 shows the vector diagram relative to optimum operation of the circuit of FIG. 2.

The efficiency of the motor 2 will be maximum when, with equal power conditions, Is is minimum, cos(γ)=1 and γ is zero. This condition implies that the CEMF Es and the current Is are in phase, as illustrated in FIG. 4.

The electric drive unit 1 is designed to control a low-dynamics device and in the example illustrated, without in any way restricting the scope of the invention, the device is formed by a fan 7.

The drive unit comprises a low inductance shunt Rsh connected as shown in FIG. 1 to the three branches of the inverter 3 and through which the currents circulating on the inverter flow, as is described in more detail below.

The controller 8 comprises a modulator 5 controlled by a first digital signal "Vs_act" representing the amplitude of the phase voltages to be applied to the electric motor and by a second digital signal "freq_act" representing the electrical frequency of the phase voltages to be applied to the electric motor 2.

For example, the three-phase bridge 3 generates, through the sine-triangle PWM modulation of substantially known type, three variable frequency voltages phase-shifted by 120° electrical degrees.

The modulator 5 generates, in a fully traditional/standard manner (for example, with the sine-triangle technique) the drive signals of the six static MOSFET switches of the inverter 3 from the aforementioned first digital signal "Vs_act" and second digital signal "freq_act".

More specifically, the first digital signal "Vs_act" represents the amplitude of the three-phase symmetrical circuit of the phase voltages applied to the motor 2 whilst the second digital signal "freq_act" represents the electrical frequency of the voltages applied to the motor, and is obtained, as described in detail below, by opportunely correcting a reference value of the electrical frequency "freq_set", set inside or outside the controller 8, directly linked to the rotation speed "N_set" using the well known relationship freq_set=N_set*p/120 where p is the number of poles of the motor 2.

"N_set" is, in turn, calculated directly from the external input which establishes the desired speed, entered using the aforementioned user interface which is not illustrated.

The modulator 5 calculates the switching on times of the six MOSFETS Q_high_U, Q_low_U, Q_high_V, Q_low_V and Q_high_W, Q_low_W.

The amplitude of the fundamental of the supply voltages of the motor, represented by "Vs_act", is programmable independently of the drive frequency, represented by "freq_act".

Before describing in detail the control loops for "Vs_act" and "freq_act" a description is given below of the factors which will be used, obtained both by the measurement of some physical quantities and by processing based on the values of the characteristic electrical parameters of the motor 2 conveniently stored in the memory of the controller 8 which implements the control loops.

With reference to the vector diagram of FIG. 4, it should be noted that it is possible to obtain an approximated expression of the optimum advance angle δopt of the voltage Vs applied relative to the CEMF Es.

Based on trigonometrical considerations on the vector diagram of FIG. 4 the exact expression may be written:

$$tg\delta_{opt} = \frac{\omega_{el} \cdot Ls \cdot Is}{E_S + Rs \cdot Is}$$

Now:

the "electrical" efficiency under the nominal load conditions, defined as Es/(Es+Rs·Is) is greater than 0.9;

the motor 2 is used to drive a load characterised by a resistant torque—proportional to the current—which is a non-linear function of the rotation speed.

Since the contribution Rs·Is in the various load conditions does not exceed 10% of Es it is possible to write Is≅k'·$\omega_{el}$ and therefore Rs·Is≅k·$\omega_{el}$ where $$k' = \frac{k}{Rs};$$

the electrical pulse is given by $\omega_{el}=\omega_{mecc}\cdot p/2$, where $\omega_{mecc}$ is the mechanical pulse, and p is the number of poles of the motor 2.

The validity of this linear approximation with $\omega_{el}$ is widely verified in technical practice in the case of high efficiency motors, designed to operate fans and pumps, as in the preferred case in the example.

As is known, the CEMF Es also depends, as well as on the temperature of the permanent magnets, linearly on the mechanical pulse which under steady-state conditions is 2/p times the electrical pulse.

This allows the entire denominator of the exact expression of tg$\delta_{opt}$ to be also considered as proportional to the electrical pulse $\omega_{el}$ and therefore makes it possible to simplify the exact expression introducing a convenient corrective factor Kcorr (greater than 1, normally less than 1.2, to be optimised experimentally); as shown below:

$$tg\delta_{opt} \cong \frac{\omega_{el} \cdot Ls \cdot Is}{K_{corr} \cdot Es} = \omega_{el} \cdot Ls \cdot Is \cdot \frac{\pi \cdot p}{K_{corr} \cdot 60 \cdot K_E \cdot \omega_{el}} = \frac{\pi \cdot Ls \cdot p}{K_{corr} \cdot 60 \cdot K_E} \cdot I_S$$

where $K_E$ represents the CEMF constant, measured in V/rpm and p represents the number of poles.

It should be noted that, the dependence on $\omega_{el}$ disappears in the simplified expression.

If the influence of the temperature of the permanent magnets on the CEMF Es is taken into account by the coefficient $\alpha_{mag}$ of variation with the residual induction temperature of the permanent magnets it is necessary to introduce the linear dependence of the CEMF constant $K_E$ on the temperature of the magnets according to the expression:

$$K_E(T_{mag})=K_{E0}\cdot[1+\alpha_{mag}\cdot(T_{mag}-T_{0mag})]$$

where $K_{E0}$ is the CEMF constant at the reference temperature $T_{0mag}$, of the permanent magnets and, as already mentioned, $\alpha_{mag}$ is the coefficient of variation of the residual induction of the permanent magnets with the temperature ($\alpha_{mag}$=−0.1%/K for Nd—Fe—B magnets).

This contribution is is especially important in the presence of a wide variability of the ambient temperature (for example, −40° C.-120° C. for electric fans forming part of radiator cooling systems for thermal motors).

Since in practice the value of the angle δopt is typically less than 30 electrical degrees, it is possible to approximate the tangent of the angle with the angle itself and therefore write:

$$\delta_{opt} \cong \frac{\pi \cdot Ls \cdot p}{K_{corr} \cdot 60 \cdot K_E(T_{mag})} \cdot I_S =$$

$$\frac{\pi \cdot Ls \cdot p}{K_{corr} \cdot 60 \cdot K_{E0} \cdot [1 + \alpha_{mag} \cdot (T_{mag} - T_{0mag})]} \cdot I_S$$

In other words, if the resistance drop RsIs is negligible relative to Es and the tangent of the advance angle δopt may be approximated with the angle itself, it may be said that, in practice, the advance angle δopt depends on the phase current Is linearly and on the temperature Tmag of the permanent magnets as described in the aforementioned simplified relationship.

The controller 8 comprises a stage 9, known as "gain_Ipk", for calculating the advance angle δopt of the voltage Vs applied to the electric motor 2 relative to the CEMF Es as a linear function of the peak value of the phase current Is.

According to a first embodiment the drive unit 1 comprises a temperature sensor 10 positioned close to the permanent magnets and in communication with the stage 9 "gain_Ipk" for providing the stage 9 with the information relating to the temperature of the permanent magnets.

The stage 9 is designed for calculating the advance angle δopt as a linear function of the peak value of the phase current Is according to the following equation:

$$\delta_{opt} = \frac{\pi \cdot Ls \cdot p}{K_{corr} \cdot 60 \cdot K_{E0} \cdot [1 + \alpha_{mag} \cdot (T_{mag} - T_{0mag})]} \cdot I_S$$

where, as indicated, "Ls" is the synchronous inductance of the electric motor expressed in Henry, "p" is the number of poles of the electric motor, KE0 is the CEMF constant at the reference temperature "T0mag" of the permanent magnets, "αmag" is the coefficient of variation with the residual induction temperature of the permanent magnets, "Tmag" is the temperature of the permanent magnets measured by the temperature sensor 10.

In other embodiments, the aforesaid formula for calculating δopt may be used with αmag=0 thus making the expression independent of the temperature.

In order to provide the aforesaid signal proportional to the current Is at the input of the stage 9 "gain_Ipk", the drive unit 1 comprises the aforesaid unit 11, of a low-cost type and purely analogue type, for measuring the peak value of the phase current Is known as "pk_detect".

The analogue unit 11, outside the controller 8, receives the voltage signal present across the shunt Rsh as input and returns as output an analogue signal, the level of which is directly proportional to the amplitude of the current which crosses the shunt Rsh. The analogue unit 11, illustrated schematically, is described in the publication EP2195916 which is referred to in its entirety herein for completeness of description.

The stage 9 "gain_Ipk" lies, as mentioned above, in the controller 8 and performs the following operations:
- A/D conversion of the analogue signal proportional to the current Is at the output from stage "pk_detect" with time interval between two consecutive samplings preferably less than 1/100 of the minimum electrical period;
- search for the maximum of the values read during each electrical period;
- use of the maximum value found for calculating δopt according to the formula identified previously.

The analogue unit 11 "pk_detect" and the stage 9 "gain_Ipk" form a first analogue digital stage 6 for calculating the optimum value δopt of the advance angle of the voltage Vs applied relative to the CEMF Es.

With reference to FIG. 3b, the angle between the applied voltage Vs and phase current Is is known as φ, positive when Vs is in advance of Is.

Indicating δ positive when the voltage Vs is in advance of the CEMF Es and γ positive when Is is in advance of the CEMF Es, the fundamental relation linking the three angles may be written, which can be derived by observing FIG. 3b, that is:

$$\gamma = \delta - \phi$$

The optimum control strategy implemented in the controller 8 independently controls the applied voltage Vs and the electrical frequency applied to the motor 2.

An optimum operation of the drive unit 1 is achieved, as described in detail below, by estimating only angle "γ" sampled at electrical frequency.

More specifically, the optimum efficiency is achieved with γ=0 and minimum current absorption.

In a first embodiment of this invention, the control of the supply voltage is implemented regardless of a control on the stability of the motor, that is, on the frequency.

The voltage control is such that the supply voltage is changed in such a way that "γ" is 0, as will be described in detail below.

The estimation of γ, performed by the controller 8, uses the aforementioned relationship between δ and φ where δ is replaced with the optimum value of the advance angle δopt mentioned above, as calculated by the controller 8, whilst φ is measured: thus:

$$\gamma_{act} = \delta_{opt} - \phi_{act}$$

In practice, in this solution "γ" is not measured directly, as this would result in costly solutions, but it is obtained by an "indirect" calculation of δopt and a direct measurement of φact.

The drive unit 1 therefore comprises a second analogue/digital stage 12 for measuring the angle φact between the voltage Vs applied to the electric motor and the phase current Is.

The controller 8 is advantageously programmed for estimating, with an electrical frequency sampling, the angle γact between the phase current Is and the counter-electromotive force Es as the difference between the optimum value of the advance angle δopt and the angle φact between the voltage Vs applied to the electric motor and the phase current Is as measured by measuring stage 12.

In further detail, the controller 8 comprises a first subtracter node 13 in communication with the first A/D stage 6 for receiving as input the optimum value of the advance angle δopt and with the stage 12 for measuring the angle φact to calculate the difference between δopt and φact and obtain γact.

A first aim of the electric drive unit 1 is maintaining the optimum efficiency of the electromechanical conversion.

As illustrated in FIG. 1, the controller 8 comprises an integrator 14, having integration constant Ki, for integrating the angle "γact" between the phase current Is and the counter-electromotive force Es and determining the first digital signal "Vs_act".

In other words, the optimum control of the applied voltage is based on the estimated angle "γact".

The integration operation, performed by the integrator 14, of the difference "δopt-φact" is such that the difference "δopt-φact" becomes zero under steady-state conditions.

In practice, the integration operation ensures that under steady-state conditions "δopt=φact" and that, therefore, "Vs_act" settles on the value consistent with the vector diagram of FIG. 4, relative to the optimum operation of the circuit of FIG. 2, that is, minimum phase current to obtain a certain torque.

Preferably, the integration operation is performed digitally by the controller 8.

The control takes place in practice by measuring the peak phase I (from which δopt is obtained) and measuring the angle "φact".

The combination of "δopt" and "φact" gives "γact" which after integration provides the supply voltage.

A second aim is to make stable the drive unit 1.

The controller 8 is programmed for calculating the aforesaid second digital signal "freq_act" as the difference between the value of reference frequency "freq_set" and a correction factor Δfreq proportional to the angle "γact" between the phase current Is and the counter-electromotive force Es.

The frequency "freq_set" is set outside the controller 8 by the aforesaid control interface or inside the controller 8 as described in detail below.

The controller 8 comprises a first calculation unit 15 which calculates the frequency "freq_set".

The controller 8 comprises a second calculation unit 16 receiving as input the angle "γact" between the phase current Is and the counter-electromotive force Es for applying a proportionality constant Kp for obtaining the correction factor "Δfreq" proportional to the angle "γact".

The controller 8 comprises a second subtracter node 17 in communication with the first calculation unit 15 for receiving as input the value of "freq_set" and in communication with the second calculation unit 16 for receiving as input the correction factor "Δfreq" and calculating the second digital signal "freq_act" as the difference between the value of "freq_set" and the value of the correction factor "Δfreq".

It is known from the literature (see, for example, *"A Sensorless, Stable V/f Control Method for Permanent-Magnet Synchronous Motor Drives"*—IEEE Transactions on Industry Applications, vol. 39, no. 3, May/June 2003) that the sinusoidal drive units based on the application of voltage and frequency to permanent magnet synchronous motor drives show a "constitutional" instability of the rotation speed, demonstrable by analysing the equations which describe the dynamic behaviour of the motor—voltage equations and torque equations.

The instability manifests itself with oscillations of the angle "δ" at a well determinable frequency depending on the inertia of the load, the $K_E$ of the motor and its synchronous inductance Ls and it is demonstrated that by modulating the frequency applied proportionally to the disturbances of the input power of the motor the oscillations of the angle "δ" are dampened.

According to this invention, the oscillations of the angle "δ" are dampened, that is, a stabilising effect is obtained by introducing the proportional, correction "Δfreq", to "γact", of the frequency "freq_set" according to the proportionality constant Kp.

The correction is made through the second subtracter node 17 (see FIG. 1).

Since "γact" is obtained by simple electrical frequency sampling, unlike the prior art, a low-cost 8-bit microcontroller may be used as controller.

Since under steady-state conditions "γact" tends to zero, having preferably set the optimum control of the applied voltage Vs as described above, the drive unit 1 ensures that the speed set by means of the aforesaid external interface is not altered by the correction factor "Δfreq" under stationary conditions (stead-state).

Looking in more detail at the analogue/digital stage 12 for measuring the angle φact between the voltage Vs applied to the electric motor and the phase current Is, it should be noted that it comprises an analogue unit 18, known as "zc_E-I_detect", for detecting the zero crossing of the current of a first phase, for example of the phase indicated with U, of the electric motor 2, and a digital unit 19 known as "fi_calc" inside the controller 8.

Figure 5:
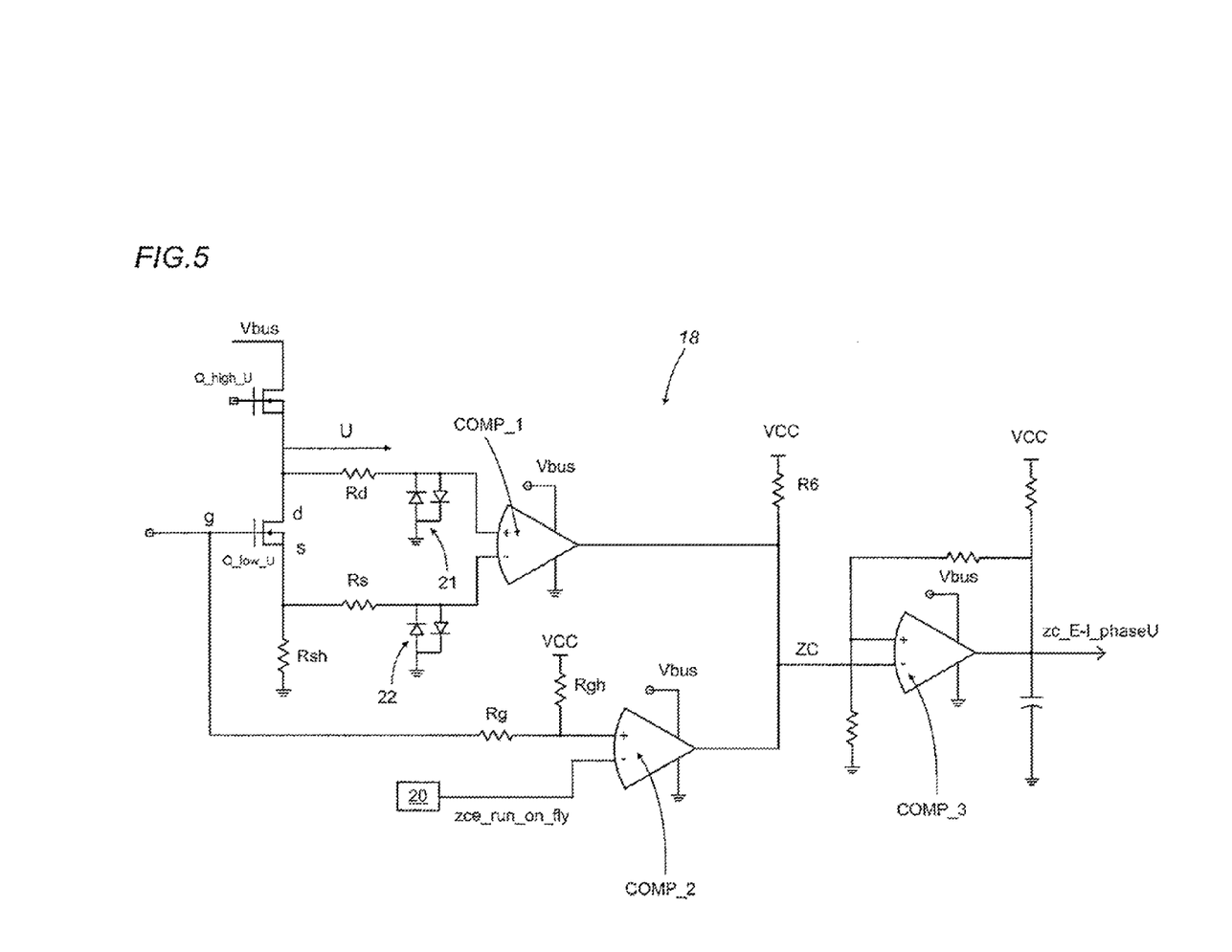
FIG. 5 shows a partial block diagram of an analogue sub-block, forming part of the drive unit of FIG. 1.

The analogue unit 18 generates as output a third digital signal "zc_E-I_phaseU" the high-low transition of which identifies, in a first operating configuration described in more detail below, the zero crossing of the current in the first phase U.

with particular reference to FIGS. 1 and 5, it should be noted that the drive unit 1 comprises, preferably for the functions described in detail below, an enabling unit 20 of the analogue unit 18, inside the controller 8.

The enabling unit 20 generates a high or low enabling signal "zce_run_on_fly".

There is the aforesaid first operating configuration of the analogue unit 18 when the enabling signal "zce_run_on_fly" is high whilst there is a second operating configuration of the analogue unit 18 when the enabling signal "zce_run_on_fly" is low.

According to the embodiment illustrated, when the enabling signal "zce_run_on_fly" is kept "high", first operating configuration, the analogue unit 18 is enabled for reading the zero crossing of the phase current Is.

When the enabling signal "zce_run_on_fly" is kept "low", second operating configuration, the analogue unit 18 is enabled for reading the zero crossing of the counter-electromotive force.

The first and second operating conditions are described in more detail below.

The controller 8 comprises a first deviator software sw1 for controlling the enabling unit 20.

The first deviator software sw1 is controlled by a fifth "bridge_enabled" digital signal, generated by the controller 8.

The low level logic "zce_run_on_fly" is only actuated if the controller 8 has verified that the modulator 5 does not control any of the six MOSFET Q_high_U, Q_low_U, Q_high_V, Q_low_V and Q_high_W, Q_low_W of the three-phase bridge 3, vice versa the enabling signal "zce_run_on_fly" is high.

With reference to FIG. 5, it should be noted that the analogue unit 18 comprises a first input in communication with the drain terminal "d" of the low MOSFET Q_low_U of the supply branch of the inverter of the first phase U, a second input in communication with the source terminal "s" of the low MOSFET Q_low_U, a third input in communication with the gate terminal "g" of the low MOSFET Q_low_U and a fourth enabling input in communication with the enabling unit 20 for receiving the enabling signal "zce_run_on_fly".

Basically, the inputs of the analogue unit "zc_E-I_detect" are:

the drain-source voltage of one of the low side MOSFET (Q_low_U in FIG. 1);
the gate voltage of the MOSFET Q_low_U;
the enabling signal, known, as "zce_run_on_fly".

The analogue unit 18 is designed, as mentioned above, for detecting the zero crossing of the first phase current U of the electric motor 2 according to the voltage drop between the first and the second input when the enabling signal is high.

As illustrated in FIG. 5, the analogue unit 18 comprises exclusively low-cost comparators.

In preferred embodiment illustrated by way of example, the analogue unit 18 comprises a first comparator "COMP_1", a second comparator "COMP_2" and a third comparator "COMP_3".

The analogue unit 18 generates as output, as mentioned above, a digital signal "zc_E-I_phaseU" the high-low transition of which identifies the zero crossing (zc) of the current in one of the phases of the motor (in the block diagram of FIG. 1 it is the current in the U phase) in the first operating configuration.

The first and the second comparators "COMP_1" and "COMP_2" have their outputs, of the "open collector" type, short-circuited and they allow an output in AND logic. The first comparator "COM_1" reads the voltage drop across the MOSFET Q_low_U both when it is in operation, where the voltage drop read is proportional to the current, and when it is locked, where the voltage drop read loses any correlation with the current circulating in the U phase.

The shared output of the first and the second comparators "COMP_1", "COMP_2" is indicated by "ZC".

The second comparator "COMP_2", connected in AND logic with "COMP_1" and driven by the gate signal of the MOSFET Q_low_U, eliminates at output ZC the reading of the undesired part of the voltage drop on the MOSFET Q_low_U leaving to the third comparator "COMP_3" the sole purpose of low-pass filter and comparator with hysteresis.

In this way, the third comparator "COMP_3" defines the zero crossing of the current with high signal-noise ratio.

Figure 6:
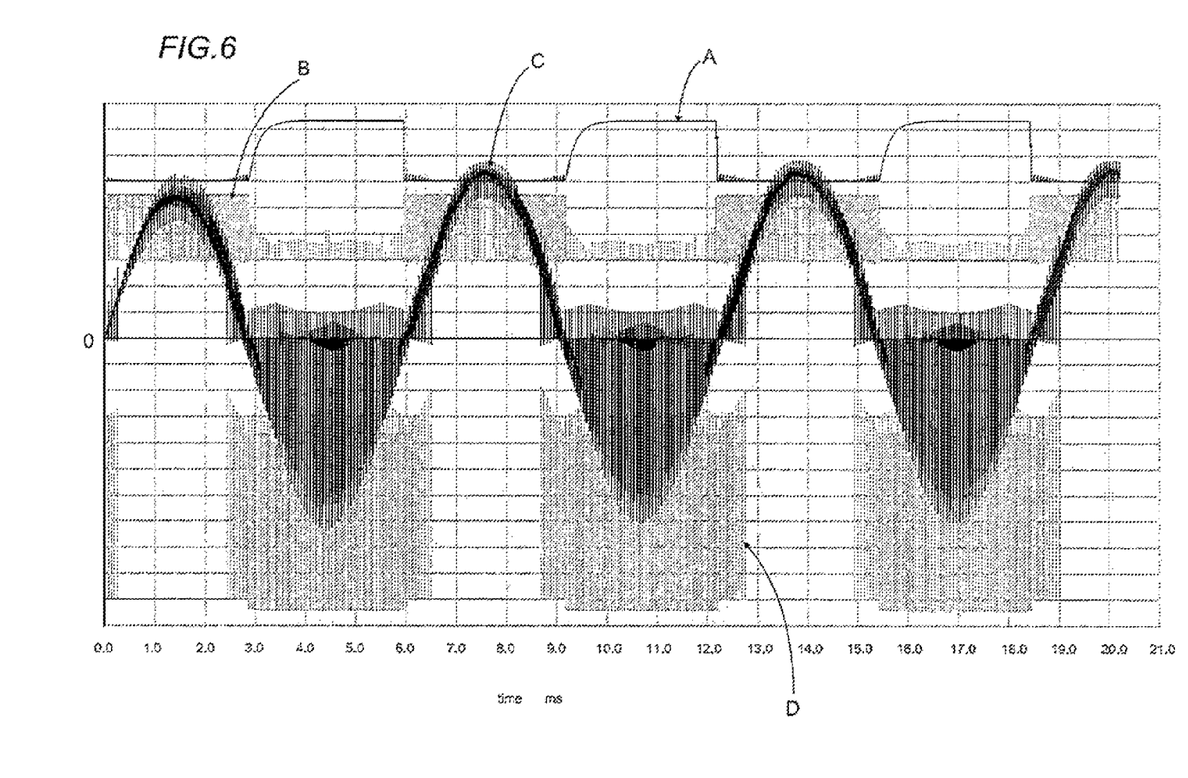
FIG. 6 shows a diagram of the main signals in the analogue sub-block of FIG. 5.

A diagram of the signals (voltages and currents), derived from circuit simulations, which describe the behaviour of the circuit is shown in FIG. 6.

The curve "A" describes the trend of the zero crossing, that is, the signal "zc_E-I_phaseU", in particular the zero crossing of the current phase.

The curve "B" describes the trend of the aforesaid signal ZC at the shared output of "COMP_1" and "COMP_2".

The curve "C" describes the current which crosses the MOSFET Q_low_U, positive when the MOSFET is operating.

The curve "D" describes the voltage Vds across the MOSFET Q_low_U.

In practice, the analogue unit 18 performs a synchronised reading at the gate control of the MOSFET Q_low_U.

Using the drain-source voltage of the low MOSFET Q_low_U provides, in the first operating configuration, the sign of the phase current U.

The reading performed is a differential "virtual earth" reading, since it is performed on the low MOSFET Q_low_U.

It should be noted that in this way neither Hall-effect sensors nor high common mode amplifiers are necessary for determining the zero crossings of the current.

With reference to FIG. 5, it should be noted that in the embodiment illustrated by way of an example, the analogue unit 18 "zc_E-I_detect" comprises, in series with the non-inverting input of "COMP_1" connected to the drain of Q_low_U, a resistor Rd and a protection circuit 21 formed by two diodes connected in antiparallel.

The inverting input of "COMP_1" has in series a resistor Rs and a protection circuit 22 also formed by two diodes connected in antiparallel.

The unit 18 comprises a resistor Rg in series with the non-inverting input of the second comparator "COMP_2" and a "pull up" resistor Rgh.

A "pull up" resistor R6 is also provided at the shared output of "COMP_1" and "COMP_2".

The comparator "COMP_3" is mounted, according to prior art not described, to form, as mentioned above, a comparator with hysteresis.

The aforementioned digital unit 19 comprises a timer 26 and it is in communication with the output of the analogue unit 18 to receive as input the third digital signal "zc_E-I_phaseU".

The digital unit 19 is in communication with the aforementioned modulator 5 for receiving as input a fourth digital signal "zc_V_phaseU" the high-low transition of which identifies the zero crossing of the voltage applied to the first phase U of the electric motor 2.

The digital unit 19 measures, using the timer 26, the period of time "Tϕ" between the zero crossing of the voltage applied to the first phase and the zero crossing of the currant in the first phase, from the signal "zc_E-I_phaseU", and obtains the angle ϕact between the voltage Vs applied to the electric motor 2 and the phase current Is from the measurement of the period of time "Tϕ" based on the second digital signal according to the formula: $\phi_{act} = 2 \cdot \pi \cdot freq\_act \cdot T_\phi$.

If in the preceding formula "freq_act" is expressed in Hz and "Tϕ" in seconds, "ϕ" is expressed in "electrical" radians.

In other words, the digital unit 19 resident in the controller 8 receives as input the digital signal "zc_E-I_phaseU" and measures with the timer 26 the period of time "Tϕ" between the zero crossing of the phase voltage applied to the phase U and the zero crossing of the current in the phase U (high→low transition of "zc_E-I_phaseU"); the instant of the zero crossing of the voltage applied to the phase U is obtained by traditional techniques inside the modulator 5: the angle "ϕact" is deduced from the measurement of the aforesaid period of time, based on the value of the electrical frequency applied "freq_act" according to the aforementioned formula.

There are operating conditions in which the aforesaid fan 7 rotates in a direction according to that of normal operation, even if the motor 2 which drives it is not energised. Under these conditions a so-called "catch rotor spinning" may be requested.

To avoid the occurrence of extremely harmful transient extra-currents (for example, in the case of forced re-starting of the motor from zero speed), the drive unit 1 has a system for reading the CEMF.

To provide this reading, the drive unit 1 comprises an additional resistor known as "Rzc_fcem_run_on_fly", with a value equal to Rd, on the phase with a 120 electrical degrees delay (phase W in the diagram of FIG. 1) relative to that on which the current zero crossing is read (phase U in the case in the example).

If the "catch rotor spinning" is requested the input "zce_run_on_fly" of the stage "zc_E-I_detect" is controlled at "low" logic level by the deviator software "sw1" controlled by the "bridge_enabled" signal inside the controller 8, forming the aforesaid second operating configuration of the analogue unit 18.

It is demonstrated, using the circuit analysis of the system with the high-impedance three-phase bridge 3 (motor 2 not energised), that the high→low transition of the output signal "zc_E-I_phaseU" of the stage "zc_E-I_detect" coincides with the zero crossing (passing from negative to positive) of the voltage between the terminals U and W (positive when VU is greater than VW).

There are 30 electrical degrees between the aforesaid zero crossing and that of the CEMF of the phase U, used for the aforementioned calculations of the optimum voltage to be applied in the operation with the motor energised.

In other words, the system for reading the CEMF is based on a linked reading of the CEMF between the phases U and W.

Figure 7:
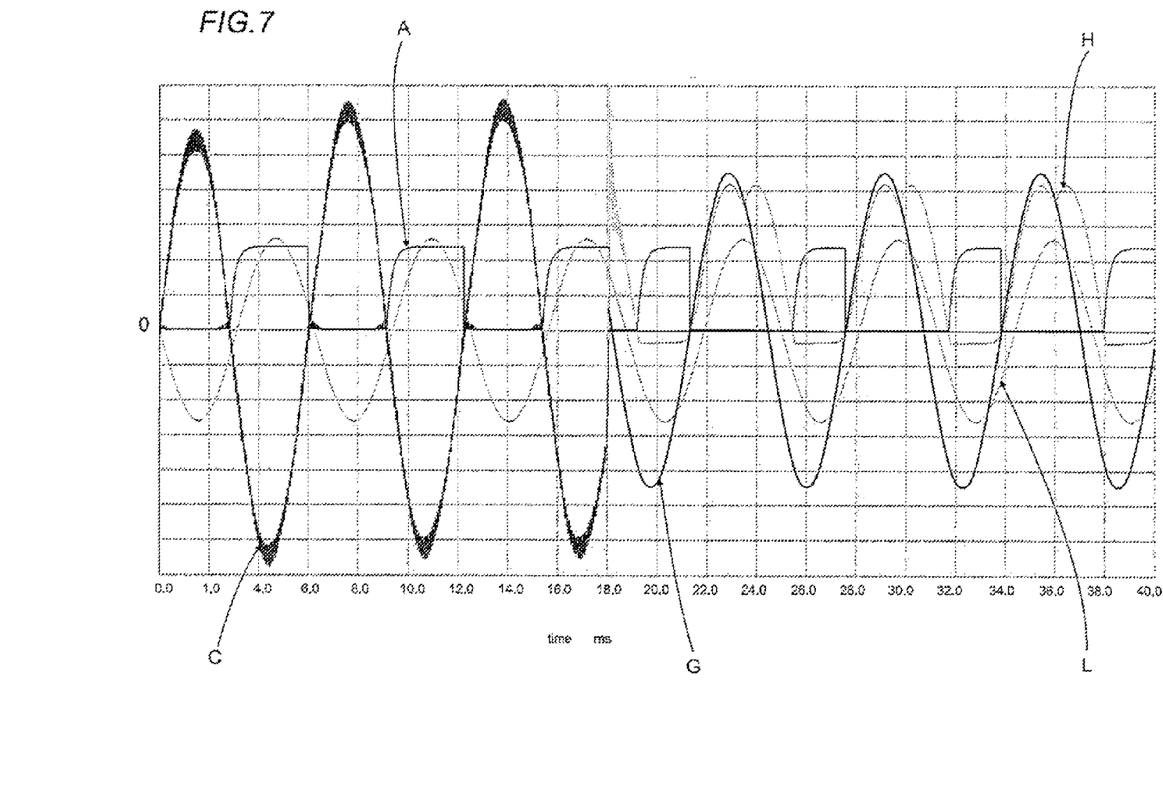
FIG. 7 shows a diagram of the signals related to the "catch rotor spinning" function of the drive unit of FIG. 1.

A circuit simulation confirming the above is shown in FIG. 7.

In the left part, referred to a situation with the bridge 3 switched ON, may be seen the curve "A" which describes the trend of the zero crossing, that is, the signal "zc_E-I_phaseU", in particular, the trend of the zero crossing of the phase current and the curve "C" which describes the current crossing the phase U, positive when leaving the motor.

In the right part, with bridge 3 not energised or switched OFF, (curve "C" at zero), curve "A" represents the trend of the signal "zc_E-I_phaseU" significant of the zero crossings of the CEMF.

The signal "zc_E-I_phaseU" useful for identifying the zero crossing of the CEMF for a soft "catch rotor spinning" is the same signal used for identifying the zero crossing of the phase current when "bridge_enabled" is at "high" logic level.

The right part of the diagram of FIG. 7 also shows a curve "G" representing the trend of the CEMF linked between the phases U and W, a curve "H" representing the trend of the drain-source voltage in the MOSFET Q_low_U with bridge 3 switched OFF and a curve "L" representing the trend of the CEMF Es of the phase U.

In the case of fan 7 rotating in a direction according to that of normal operation and having to supply the motor 2 whilst it is rotating non-energised, that is, performing the aforesaid "catch rotor spinning" obtaining a soft acceleration, it is necessary to:

apply an initial voltage Vs equal to the CEMF developed by the motor not energised;

apply an initial frequency corresponding to the speed of rotation of the motor at the instant of energising.

The aforesaid calculation unit 15 comprises a unit 24, known as "freq_calc", resident in the controller 8 for determining the value of "freq_set" to apply in the case of "catch rotor spinning".

The unit 24 receives as input, from the analogue unit 18, the signal "zc_E-I_phaseU".

The unit "freq_calc" comprises a timer 25 for measuring the time Tfly between two successive high→low transitions of the signal "zc_E-I_phaseU".

The unit "freq_calc" calculates the frequency F_fly=1/Tfly corresponding to the aforesaid time for applying the calculated value, indicated by "freq_fly", as the initial value of "freq_set" for the "catch rotor spinning".

As illustrated, the drive unit 1 comprises a second deviator software sw2, controlled by the "bridge_enabled" signal for imposing on "freq_set" the value "freq_fly" in the case in which the bridge 3 is switched OFF; when the bridge 3 is switched on, "freq_set" corresponds to a value set by the aforesaid external interface "freq_set_run".

Given the presence of the aforesaid subtracter node 17, to avoid undesired transients on "freq_act", the drive unit 1 comprises a third deviator software "sw3" (FIG. 1), controlled by the "bridge_enabled" signal for contextually imposing to zero the input of the second calculation unit 16.

In practice, the circuit "zc_E-I_detect" measures the electrical frequency corresponding to the speed of the motor not energised and then allows synchronisation of "freq_set" to avoid restarting the motor from zero speed.

Having the signal "freq_fly" and remembering that the memory of the controller 8 stores the value of the CEMF constant $K_{E0}$, the temperature coefficient αmag and the reference temperature of the permanent magnets T0mag and that the controller 8 acquires front sensor 10 the current temperature of the magnets Tmag, the controller 8 calculates the value "Vs_act" to be applied initially.

Having identified and "actuated" the initial values of "Vs_act" and "freq_act" to be applied to the motor, the controller 8, resetting the "bridge_enabled" signal to level "high", returns the enabling signal "zce_run_on_fly" to logic level "high" and proceeds with the aforesaid operations for optimum and stable actuation (integral operation on γact for reaching the optimum voltage and restoring proportional operation on γact for correction of "freq_set" for stability purposes). The presence of the aforesaid resistor "Rzc_fcem_run_on_fly" does not influence in any way operation of the system when "zce_run_on_fly" is at logic level "high" and does not result in any excessive additional absorption of current of the drive unit when the drive unit need not actuate the control "freq_set_run".

The invention claimed is:

1. An electric drive unit comprising:
   an electric motor with permanent magnets,
   an inverter supplying the electric motor,
   a continuous current stage supplying the inverter,
   a modulator driving the inverter,
   a controller controlling the modulator by a first digital signal (Vs_act) representing an amplitude of phase voltages (Vs) to be applied to the electric motor and by a second digital signal (freq_act) representing an electrical frequency of the phase voltages to be applied to the electric motor based on a reference frequency (freq_set) set outside or inside the controller;
   a first analogue/digital stage for calculating an optimum value of an advance angle (δopt) of the voltage (Vs) applied to the electric motor relative to a counter-electromotive force (Es),
   a second analogue/digital stage for measuring an angle (ϕact) between the voltage (Vs) applied to the electric motor and a phase current (Is),
   a temperature sensor positioned close to the permanent magnets and in communication with the first analogue/digital stage for providing to the first analogue/digital stage information relating to a temperature of the permanent magnets, the first analogue/digital stage being designed for calculating the optimum value of the advance angle (δopt) as a linear function of a peak value of the phase current (Is) according to a following equation:

$$\delta_{opt} = \frac{\pi \cdot Ls \cdot p}{K_{corr} \cdot 60 \cdot K_{E0} \cdot [1 + \alpha_{mag} \cdot (T_{mag} - T_{0mag})]} \cdot Is$$

where "Ls" is a synchronous inductance of the electric motor expressed in Henry, "p" is a number of poles of the electric motor, "Kcorr" is a corrective coefficient with a value greater than 1 and less than 1.2, "KE0" is a counter-electromotive force constant at a reference temperature "T0mag" of the permanent magnets, "αmag" is a coefficient of variation with a residual induction temperature of the permanent magnets, "Tmag" is the temperature of the permanent magnets measured by the temperature sensor, the controller being programmed for estimating, with an electrical frequency sampling, an angle γact between the phase current (Is) and the counter-electromotive force (Es) as a difference between the optimum value of the advance angle (δopt) and the angle (ϕact) measured between the voltage (Vs) applied to the electric motor and the phase current (Is).

2. The electric drive unit according to claim 1, where the controller comprises an integrator for
   integrating the angle (γact) between the phase current (Is) and the counter-electromotive force (Es) for determining the first digital signal (Vs_act).

3. The electric drive unit according to claim 1, where the controller is programmed for calculating a frequency correction (Δfreq) proportional to the angle (γact) between the phase current (Is) and the counter-electromotive force (Es) and calculating the second digital signal (freq_act) as a difference between the value of the reference frequency (freq_set) and a frequency correction (Δfreq).

4. The drive unit according to claim 1, where the second analogue/digital stage comprises an analogue unit generating as output a third digital signal (zc_E-I_phaseU) and having a first input in communication with a drain terminal of a low MOSFET (Q_low_U) of a supply branch of an inverter of a first phase (U) of the electric motor, a second input in communication with a source terminal of the low MOSFET (Q_low_U), a third input in communication with a gate terminal of the low MOSFET (Q_low_U), and a fourth enabling input, the drive unit further comprising an enabling unit of the analogue unit generating a high or low enabling signal (zce_run_on_fly) and in communication with the fourth enabling input for transmitting an enabling signal (zce_run_on_fly) to the analogue unit, the analogue unit being driven by the third input and configured for detecting a zero crossing of the current (Is) in a first phase (U) of the electric motor based on a voltage drop between the first and second inputs, the enabling signal (zce_run_on_fly) being high, a high-low transition of the third digital signal (zc_E-I_phaseU) identifying the zero crossing of the current in the first phase (U) when the inverter is switched ON.

5. The drive unit according to claim 1, where the second analogue/digital stage comprises an analogue unit generating as output a third digital signal (zc_E-I_phaseU) and having a first input in communication with a drain terminal of a low MOSFET (Q_low_U) of a supply branch of an inverter of a first phase (U) of the electric motor, a second input in communication with a source terminal of the low MOSFET (Q_low_U), a third input in communication with a gate terminal of the low MOSFET (Q_low_U), and a fourth enabling input,
the drive unit further comprising:
a resistor (Rzc_fcem_run_on_fly) on a second phase (W) with a 120 electrical degrees delay relative to the first phase (U),
an enabling unit of the analogue unit generating a high or low enabling signal (zce_run_on_fly) and in communication with the fourth enabling input for transmitting the enabling signal (zce_run_on_fly) to the analogue unit, the analogue unit comprising:
a resistor in series with the first input with a value equal to that of the resistor (Rzc_fcem_run_on_fly) on the second phase (W) and being driven by the third input and configured for detecting a zero crossing of the counter-electromotive force linked between the first phase (U) and the second phase (W) with the control signal (zce_run_on_fly) being low and the inverter switched OFF.

6. The electric drive unit according to claim 5, where the controller comprises:
a first calculation unit in communication with the analogue unit for receiving as input the third digital signal (zc_E-I_phaseU) and calculating an electrical frequency (freq_fly) corresponding to a time between two successive high-low transitions of the third digital signal (zc_E-I_phaseU),
the controller being programmed for imposing a value to the reference frequency (freq_set) equal to the electrical frequency (freq_fly) corresponding to the time between two successive high-low transitions of the third digital signal (zc_E-I_phaseU) when the inverter is switched OFF, the reference frequency (freq_set) being set inside the controller.

7. The drive unit according to claim 6, where the controller is designed for generating a fifth digital signal (bridge_enabled) which assumes high logic level if the modulator controls at least one branch of the inverter and low logic level if all the branches of the inverter are switched OFF,
the enabling unit being controlled by the fifth digital signal (bridge_enabled) for imposing a high value to the enabling signal (zce_run_on_fly) when the fifth digital signal (bridge_enabled) has high logic level or for imposing a low value to the enabling signal (zce_run_on_fly) when the fifth digital signal (bridge_enabled) has low logic level,
the calculation unit (15) being controlled by the fifth digital signal (bridge_enabled) for imposing on the reference frequency (freq_set)
a value equal to the electrical frequency (freq_fly) corresponding to the time between two successive high-low transitions of the third digital signal (zc_E-I_phaseU) when the fifth digital signal (bridge_enabled) has low logic level or imposing on the reference frequency (freq_set) a preset frequency value (freq_set_run) when the fifth digital signal (bridge_enabled) has high logic level,
the reference frequency (freq_set) being set inside the controller (8) when the fifth digital signal (bridge_enabled) has low logic level and
being set outside the controller when the fifth digital signal (bridge_enabled) has high logic level.

\* \* \* \* \*